United States Patent

Rutkowski et al.

[11] Patent Number: 5,639,261
[45] Date of Patent: Jun. 17, 1997

[54] MODULAR CROSS-CONNECT SYSTEM

[75] Inventors: John Anthony Rutkowski, Jackson, N.J.; William Tracy Spitz; Stanley Everett Wright, both of Indianapolis, Ind.

[73] Assignee: Lucent Technologies Inc., Murray Hill, N.J.

[21] Appl. No.: 358,872

[22] Filed: Dec. 23, 1994

[51] Int. Cl.⁶ ................................................. H01R 13/60
[52] U.S. Cl. ........................... 439/534; 439/31; 439/713
[58] Field of Search ............................ 439/31, 131, 136, 439/341, 534, 544, 557, 713, 719

[56] References Cited

U.S. PATENT DOCUMENTS

| | | | |
|---|---|---|---|
| 3,904,936 | 9/1975 | Hamrick, Jr. et al. | 439/131 |
| 3,992,070 | 11/1976 | Dunn et al. | 439/131 |
| 4,099,823 | 7/1978 | D'Allessio | 439/713 |
| 4,536,052 | 8/1985 | Baker et al. | |
| 4,712,232 | 12/1987 | Rodgers | 439/719 |
| 5,090,645 | 2/1992 | Zuercher | 439/719 |
| 5,122,069 | 6/1992 | Brownlie et al. | 439/131 |
| 5,238,426 | 8/1993 | Arnett | 439/557 |
| 5,302,140 | 4/1994 | Arnett | 439/557 |

OTHER PUBLICATIONS

AT&T Network Systems Brochure on 1100 Modular Jack Panel, AT&T Network Systems, marketing, 4013FS–Issue 4–LM–Jan. 1994.

*Primary Examiner*—David L. Pirlot
*Assistant Examiner*—Brian J. Biggi

[57] ABSTRACT

The invention is a modular cross-connect system which has a connector block having an array of connector jacks therein and which is mountable on a panel. The block has pivot pins for pivotally mounting it in an aperture in the panel, and the rear of the block has connectors thereon for connecting wires or other signal carriers to the connector jacks. The block can be pivoted to give access to the connectors from in front of the panel so that connections can be made, after which the block can be pivoted back to its operative position and latched in place. In a second embodiment of the invention, the block is supported by retaining clips extending from the front of the panel so that it can be supported in front of the panel during wiring after which it is inserted into an aperture in the panel and pivotally supported therein, with means on the block for latching it in place.

30 Claims, 7 Drawing Sheets

MODULAR CROSS-CONNECT SYSTEM

FIELD OF INVENTION

This invention relates to a cross-connect panel and, more particularly, to the combination of a panel and a distribution module for use with the panel.

BACKGROUND OF THE INVENTION

In local area networking and telecommunication hook-ups, especially in customer premises, it is often necessary to connect particular telephone or other apparatus such as computer lines which extend from a particular piece of equipment at a particular physical location to other equipment circuits which extend from, for example, a PBX or dam network to a central switching facility. In the past, this cross-connection has been within the province of a telephone company craftperson upon a customer's request. However, because of the changing nature of the telephone industry, with responsibilities being shifted more and more to the individual customer, it has become the practice to have the customers make their own telephone and equipment arrangements and hook-ups without reliance on the use of skilled personnel.

Such reliance upon the customer to make such hook-ups or cross-connections gives rise to numerous problems leading to efforts on the part of distribution hardware equipment manufacturers to simplify the process as much as possible. One problem has been the use of insulation displacement connectors on the connector module in, for example, local area network (LAN) connecting or distribution fields, wherein the wires are forced between the blades for both mechanical and electrical connection. Such an operation often requires both special tools and special skills, and presents a definite area for simplification. Also, the installation must be such that there is ready access to the connectors for performing the wiring operation. A second problem arises because typical cross-connect units must be individually secured to mounting surfaces. All of the wires involved must be routed, dressed, and connected properly, and usually present to the assembler an unintelligible mass of intertwined and often tangled wires.

One proposed solution to at least some of the foregoing problems is shown in U.S. Pat. No. 4,536,052 of Baker et al. In the arrangement of that patent, a modular cross-connect panel is designed to allow multi-conductor cables carrying a number of line circuits to be plugged into mating connectors. The connectors from the lines as well as from the stations are pre-wired to standard telephone jacks thereby allowing the customer to snap one end of a double plug-ended cord into the desired line jack and the other end of the cord into the desired station jack. The cross-connect comprises a housing having several hinged rotating section connector panels, each of which accepts multi-pair cables. The hinged section is mounted to a forward edge of a support section and the multi-pair cables are suspended between the two sections. Included in each section are a plurality of jacks arranged in groups, vertically spaced from each other. The individual cable pairs within the cable are connected to individual jacks and the double plug-ended path cords are then used to cross-connect individual stations with switching facility lines. The jacks are grouped in sets of six mounted on plug boards which are mounted on the panel by means of ramps molded on each of the individual jacks. Thus, the jacks, which are mounted on the board, retain the board within openings in the panel. The cables leading to the jacks from, for example, a PBX are each fitted with an end connector which, in turn, is adapted to plug into the rear of each set of six jacks. Such an arrangement necessitates a pre-wiring and connector mounting of the cables, which is beyond the normal competence of the customers, and which reduces the flexibility of the arrangement. Any changes that may be desired to be made to the jack connections can necessitate a rewired connector on the cable, which is undesirable from both a time and cost standpoint.

The use of the jacks to retain the plug board on the panel can cause problems inasmuch as, for secure mounting, each plug board must have a full complement of jacks. In addition, such an arrangement necessitates the use of jacks having ramps molded thereon rather than standard jacks which have no ramp.

A universal patch panel is shown in U.S. Pat. No. 5,238,426 of Arnett and in U.S. Pat. No. 5,302,140 of Arnett, wherein a panel has an array of a plurality of openings therein. Each opening is adapted to receive a mounting adapter of plastic material having first and second depressible cantilever beams, which function to hold the adapter within the opening. The adapter, in turn, has grooves in the interior side walls thereof for holding a connector having resilient tabs therein. Each individual connector is wired and then inserted into and locked within the adapter. This arrangement allows any of a number of different types of connectors to be individually mounted in the panel, provided each connector has resilient tabs for locking the connector in place within the adapter. When the panel contains a full complement of connectors so mounted, cross-connections among different connectors can easily be made from the front of the panel by the customer.

In both the Arnett arrangement and the Baker et al. arrangement, the wiring of the connectors is preferably performed by a skilled craftperson. In Baker et al., the cables leading to the jacks from, for example, a PBX, must have fitted on the end thereof the connectors which are plugged into the individual connector jacks. Thus, the craftperson is called upon to wire these end connectors and to mount them, which can be both time consuming and which presents a potential for mistakes. In the Arnett arrangement, the individual connectors must each be wired and then mounted in the panel in the proper position relative to the other connectors. This too can be a time consuming operation and can lead to mistakes in wiring or placement of the connector in the panel. In addition, it is sometimes the case that the rack on which the patch panel is mounted is not readily accessible from the rear. The Baker et al. arrangement allows for this by virtue of the panel being outwardly pivoting. The Arnett arrangement provides front termination to the IDC's by virtue of its slide out collar. However, due to its 90 degree orientation of the IDC terminals to the modular jack face, rear terminations are not readily accessible.

A commercially available modular jack panel is the AT&T 1100 panel, in which rows of jacks are mounted on the panel, and access to the rear of the jacks is had by hinging the panel to its support surface or rack. When it is necessary to wire or otherwise connect the jacks, the panel may be unlatched and swung outward to provide access to the rear of the panel and hence the jacks. Thus, as in the Baker et al. arrangement, the entire panel is swung outward when perhaps only one jack needs to be wired.

SUMMARY OF THE INVENTION

The present invention is a modular panel and connector arrangement in which a panel for mounting connector jacks has a plurality of apertures therein for receiving connector blocks, wherein each connector block has a plurality, preferably six, connector jacks formed therein. The top from edge of the block terminates in a flange. Extending from the rear of the panel on each side of each aperture are U-shaped connector block mounting brackets. Each block has pivot pins extending from either side thereof which are adapted to fit within the U-shaped brackets to allow the block to be pivoted with respect thereto.

In a first illustrative embodiment of the invention, the block may be pivoted from its closed position to bring its rear face to the front of the panel in an open position. On the rear face of the block are a plurality of insulation displacement connectors (IDC's), such as AT&T 110 type connectors, into which the individual wires of the cable being connected are inserted and which are electrically connected to the connector jacks. Thus, the connector block can be wired from the front of the panel. The top of the block, which is preferably of a plastic material, has a cantilevered latch so that, after the block is wired it can be pivoted back to bring the connectors to the front of the panel and snapped into place and held there by the latch. When the blocks have been wired and snapped into place, there is an array of connector jacks on the front of the panel for connecting the various components thereto, and hence, to the cables, and cross-connections as desired can then be made by the customers.

By virtue of the connector blocks being individually pivotable rather than the entire panel, individual blocks may be worked on, such as for wiring or re-wiring, without the necessity of pivoting the entire panel, as in the Baker et al. arrangement, and the need for mounting adapters is obviated. Inasmuch as both the front and rear faces of the connector blocks are accessible from the front of the panel, the space behind each panel, and hence the entire rack or wall or other surface containing the panels, does not have to be such as to allow access from the rear of the panel or rack.

During the wiring of the connector block, it is necessary that the individual wires be forced into the insulation displacement connectors. Where such connectors are offset from the pivot axis of the block, such forces that are generated will tend to cause the block to pivot while it is being wired, which is undesirable. To forestall the tendency to pivot, the connector block is slotted on each side to receive a sloped portion of the plate or panel at the lower corners of the opening into which the block fits. The sloped portion functions as a stop to limit the pivoting of the block.

The insulation displacement connector (IDC's) on the rear face of the connector block are oriented transversely of the block. As will be apparent hereinafter, such an orientation makes it possible to wire the connectors without the necessity of having to stack the wires, as would be the case if the IDC's were oriented in the vertical direction.

in a second embodiment of the invention, first and second retainer clips, preferably of suitable plastic material, are mounted by clipping to the panel on either side of the opening and extend outwardly from the front face thereof. Each of the retainer clips has a semi-circular support portion into which the pivot pins of the connector block are inserted and retained. An angularly oriented web extends downwardly and outwardly from the semi-circular portions, and the lower end of the web is terminated in a flange configured to hold the top edge flange of the block. When the block is placed on the retainer clip it is firmly held in place by the semicircular portions and the bottom flange, thereby eliminating any tendency of the block to move or pivot as the wires are being connected to the IDC's. After the wiring is completed, the block may be removed from the retainer clips and inserted into the opening in the panel, with the pivot pins being inserted into the U-shaped brackets on the rear of the panel. The clips can be removed from the panel after wiring and insertion of the blocks, but, preferably, they are left in place to act as wire cord or cable organizers. In order to function, the clips have a substantially horizontal web portion extending from the flange toward the plate, and the angled web portion has a transverse slot or opening therein through which the cords are passed to rest upon the horizontal web. With this arrangement, the cords are maintained neatly in close proximity to the plate or panel and not in a tangled unintelligible mass of loose hanging cords.

In a variation of the connector block module usable with both the foregoing embodiments, the block is formed with a radiused and ramped flange on either side of the front face thereof, with the radiused portion of the flange leading from the side slot and the flange tapering down to the front face of the block. Such a flange configuration facilitates the insertion of the block within the panel opening by providing a lead-in therefor.

In both embodiments of the invention, the panel may be formed with a transverse flange member extending from the rear surface or face thereof. Cable organizing brackets may then be clipped or otherwise mounted to the flange, located between the connector block openings in the panel. Each bracket has a roughly D-shaped configuration, with a slot formed therein to allow the cable to pass into the interior of the D-shape. The brackets thus serve to hold the cables coming from the PBX, for example, to maintain an orderly assembly of cables in the rear of the panel and the rack.

The modular arrangement of connector block and panel wherein each connector block contains one set of six connectors, for example, and the pivoting capability of the block for wiring greatly simplifies the complete wiring of a panel or panels, does not require any separate mounting hardware, and permits total access to the connector jacks, both front and rear, from the front of the panel, thereby eliminating space requirements in the rear of the rack upon which the panels are mounted. As a consequence, the block and panel assembly can be mounted, for instance, in a wall. Additionally, when it becomes necessary to re-wire only one or two connectors, with the modular apparatus of the invention these connectors can be easily accessed without disturbing in any way the other connectors mounted on the panel, and without moving the panel itself.

The principals of the invention are applicable to other types of connectors including coaxial cable connectors and fiber optic connectors as well. The connector block can be equipped to mount various types of connectors, whether electrical wire or optical fiber, and because of the modular nature of the structure, the panel may contain a variety of such modified connector blocks in a modular array.

The numerous features and advantages of the present invention will be readily apparent from the following detailed description, read in conjunction with the accompanying drawings.

DETAILED DESCRIPTION

Figure 1:
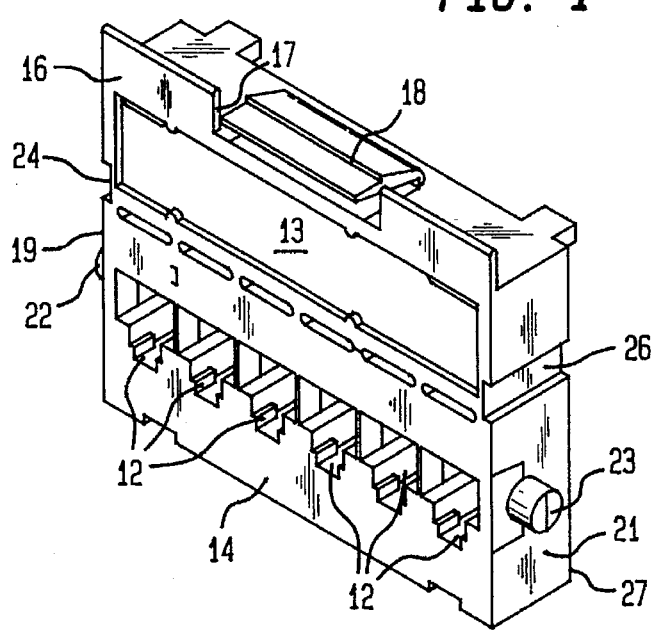
FIG. 1 is a perspective view of a modular connector block of the invention.
Figure 5:
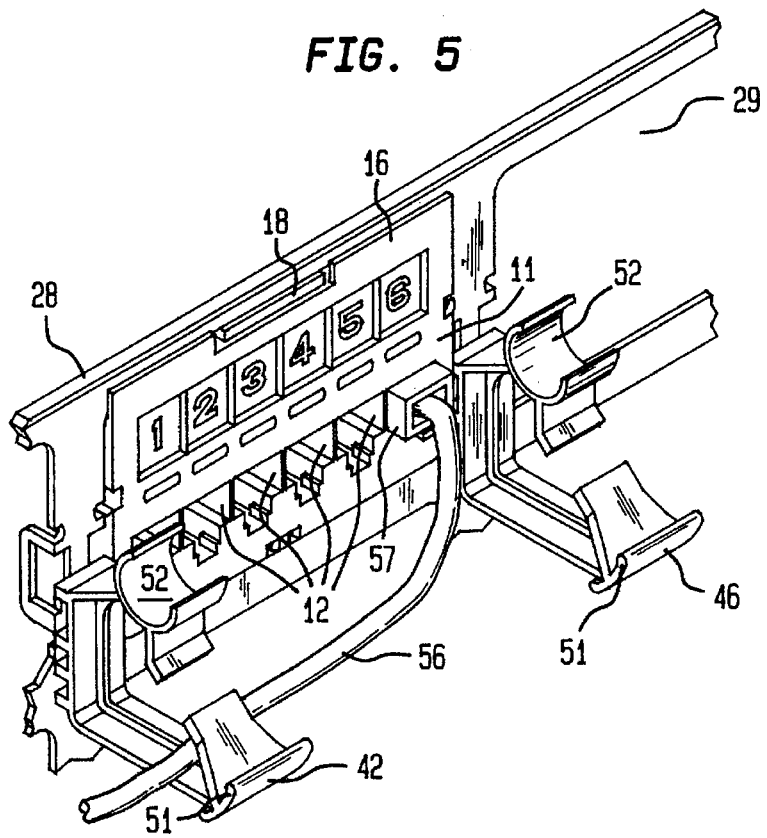

The present invention is intended to facilitate both the wiring and assembly of connector panels and the cross-connect capability of the connector panels. To this end the basic unit of the system is a modular connector block 11, as illustrated in FIG. 1. Block 11, which is preferably molded from a plastic material, such as a polycarbonate, has formed therein a plurality, such as six, eight pin connector jack openings 12,12 with their appropriate wiring and contacts incorporated therein. Immediately above the linear array of connectors is an opening 13 into which a name plate, identifying numbers (as shown in FIG. 5), or other types of identifiers or information may be inserted. The front face 14 of connector block 11 continues above the top of block 11 in the form of a flange 16 which has a central opening 17 therein. Located within opening 17 is a cantilevered latch 18 which preferably, although not necessarily, is formed during the block molding or casting process, and, as will be apparent hereinafter, is used to lock connector block 11 in place in its panel, as best seen, for example, in FIG. 2. On either end of block 11 and extending outwardly from the end (or side) surface 19 and 21 are first and second pivot pins 22 and 23, the function of which will be explained more fully hereinafter. Each of the end surfaces 19 and 21 has a square notch or groove 24 and 26, respectively, extending across the end surfaces from the front face 14 of block 11 to the rear face 27 thereof. Each of slots 24 and 26 has a sloped portion 25 at the end thereof adjacent the front face of block 11. The remaining features of block 11 will be more readily apparent from a consideration of FIGS. 2A and 2B.

Figure 2A:
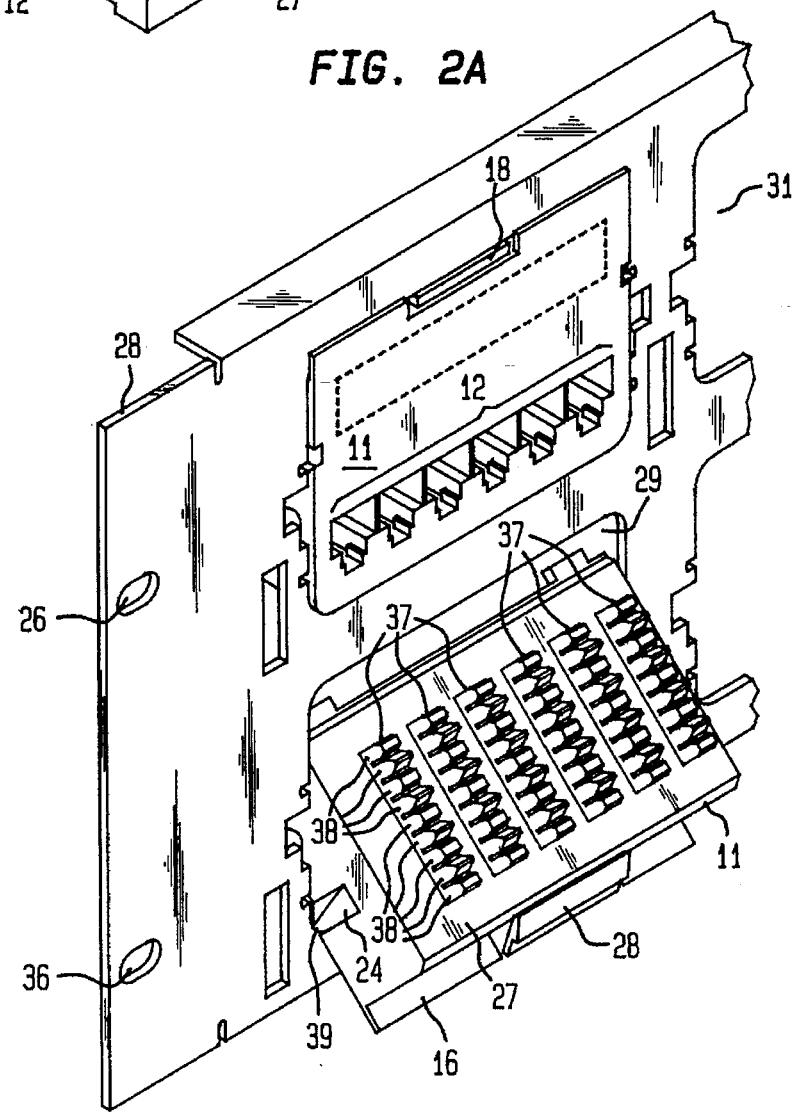
FIG. 2A is a perspective view of a panel having modular connector blocks mounted therein.
Figure 2B:
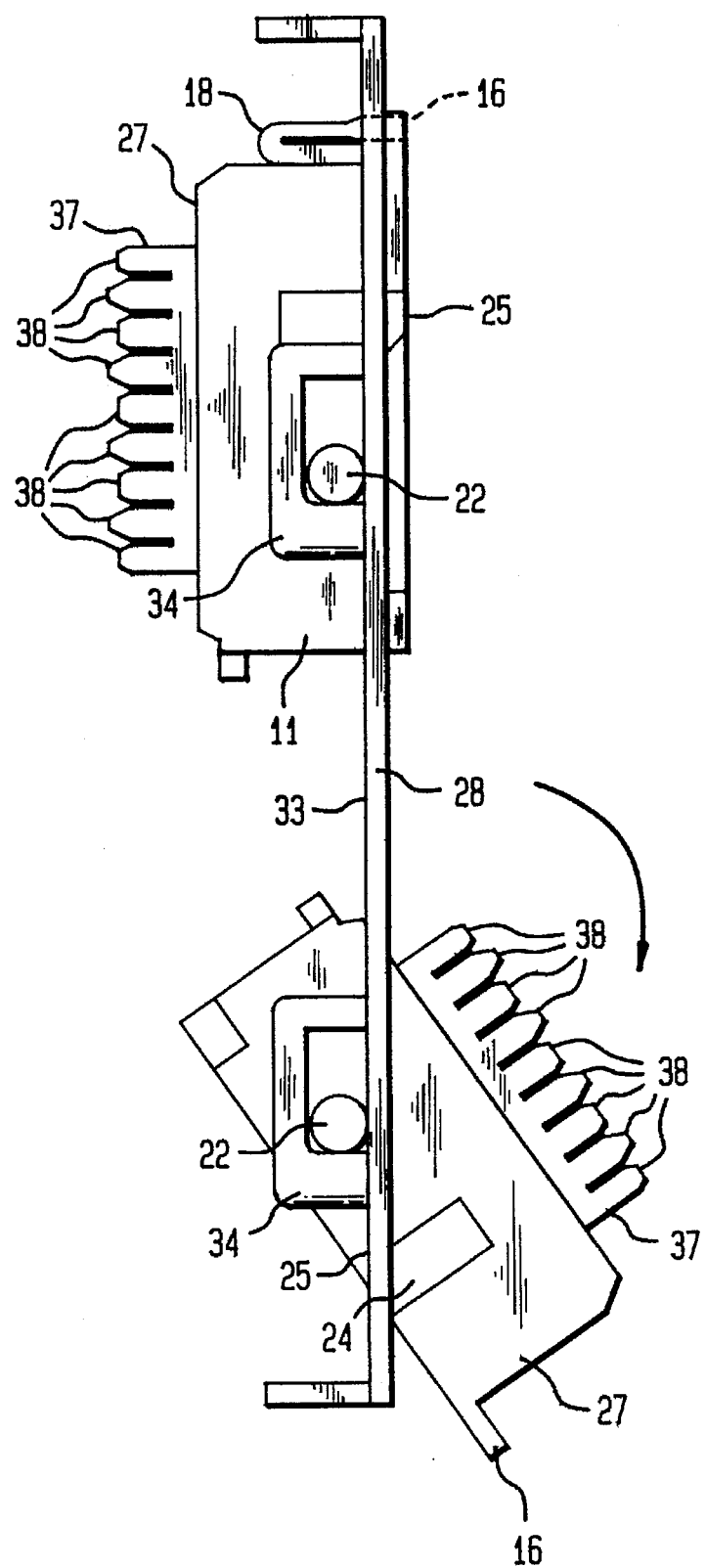
FIG. 2B is a side elevation view of the assembly of FIG. 2A.

In FIG. 2A there is shown in perspective a portion of a panel 28 have a lower row of connector block receiving apertures 29,29 and an upper row of connector block receiving apertures 31,31. As shown in FIG. 2A, a connector block 11 is mounted in one of the apertures 31 and snapped into place by means of cantilevered latch 18. As shown in FIG. 2B, and as will be discussed more fully hereinafter, panel 28 has, extending from the rear surface 33 thereof, U-shaped connector block mounting brackets 34,34, positioned on each side of each aperture 29,29. Panel 28 and brackets 34 are preferably made of a suitable metallic material, such as steel or aluminum, and panel 28 has mounting holes 36,36 for mounting the panel on a rack, not shown. As can be seen in FIG. 2A, the upper connector block 11 is mounted in its operative position and held in place by means of latch 18 and pins 22 and 23 riding in U-shaped mounting brackets 34,34. The lower block 11 is shown in its wiring position, latch 18 having been released and block 11 pivoted on pins 22 and 23 in the direction of the arrow to the position shown, where the rear face 27 faces forward to provide access thereto for wiring the connector block 11.

Extending from the rear surface 27 of each connector block 11 are six columns 37,37 of slotted insulation displacement connectors (IDC's) 38,38, one column for each of the jack openings 12 and having eight IDC connectors 38,38 therein. Each individual wire (not shown) leading from the cable to the connector block is inserted into an IDC 38 to wire each of the connector receptacles or openings 12. As will be more apparent in connection with FIGS. 3, 4 and 5, the slots of the IDC's 38,38 are oriented transversely to the block 11, parallel to the axes defined by the pivot pins, so that the individual wires can be laid flat on or adjacent to the rear surface 27, with each wire being bent to fit into its appropriate IDC. The process of inserting the wires into the individual IDC's requires a certain amount of pressure which, in turn, would tend to cause the pivoted block 11 to rotate about the axis of its pivot pins 22 and 23. To minimize such tendency to rotate, the openings 29,29 are provided with sloped lower corners 39,39, only the left ones of which can be seen clearly in FIG. 2A. The slopes 39,39 each engages shaped portion 25 of the slots 24 and 26 on block 11 and act as stops to prevent further rotation in the direction opposite to the direction of the arrow in FIG. 2B when the wires are being inserted into the IDC's, and the front face of panel 28 engages the slot 24 and 26 to prevent rotation in the direction of the arrow. Thus, the block 11 is effectively locked in place in the open position during the wiring. After the wiring of each block is completed, it is lifted slightly to disengage the slots 24 and 26 from the panel and sloped portion 39, it is rotated back into its operative position and snapped into place by means of latch 18. When all of the block 11 have been wired and restored to operative position, connections or cross-connections can then be made among the various jack connectors in the manner shown, for example, in the Arnett patent in FIG. 1 thereof.

Figure 3:
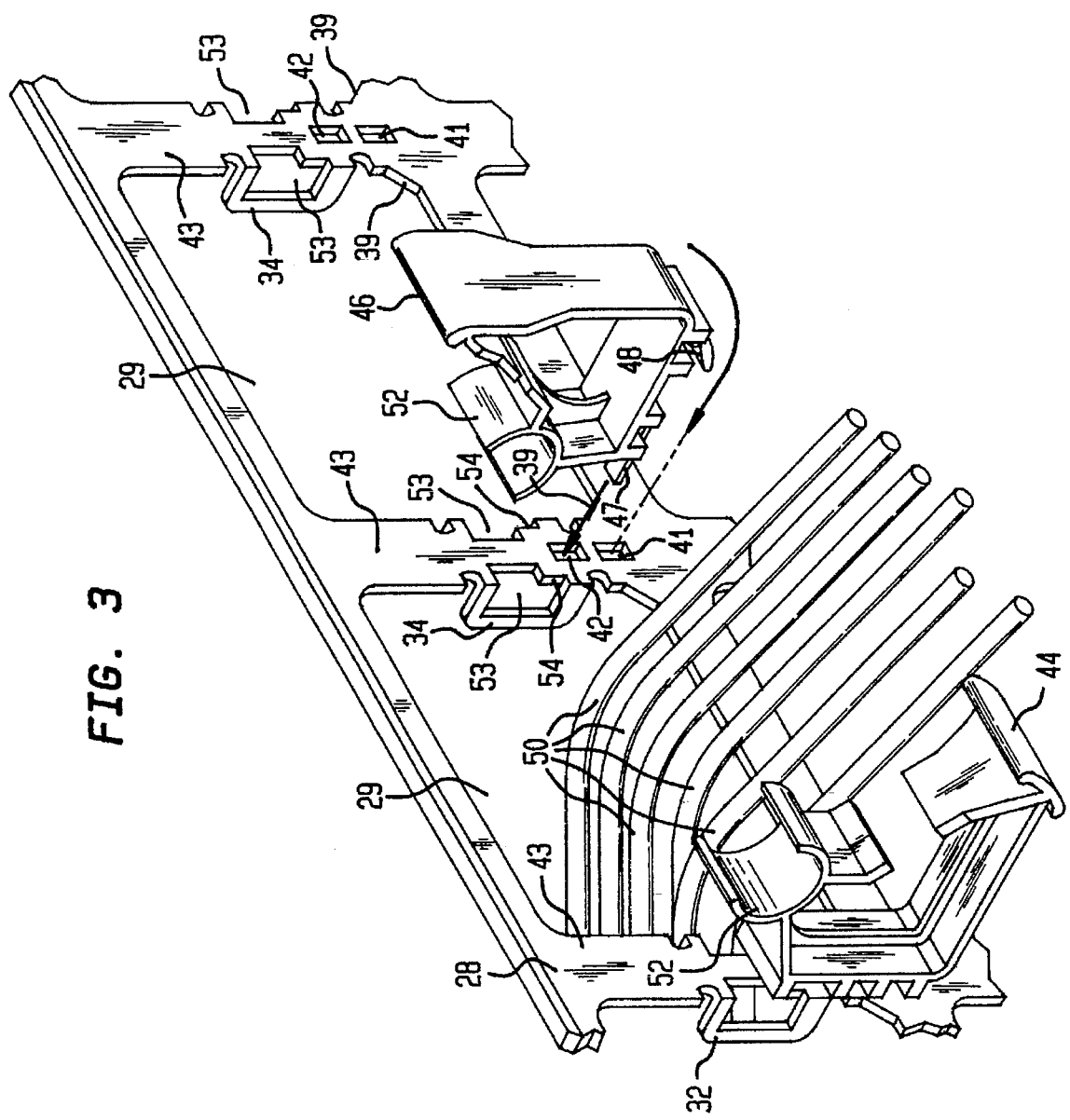
FIG. 3, 4 and 5 are perspective views illustrating the steps in wiring and installing a connector block on the panel.
Figure 4:
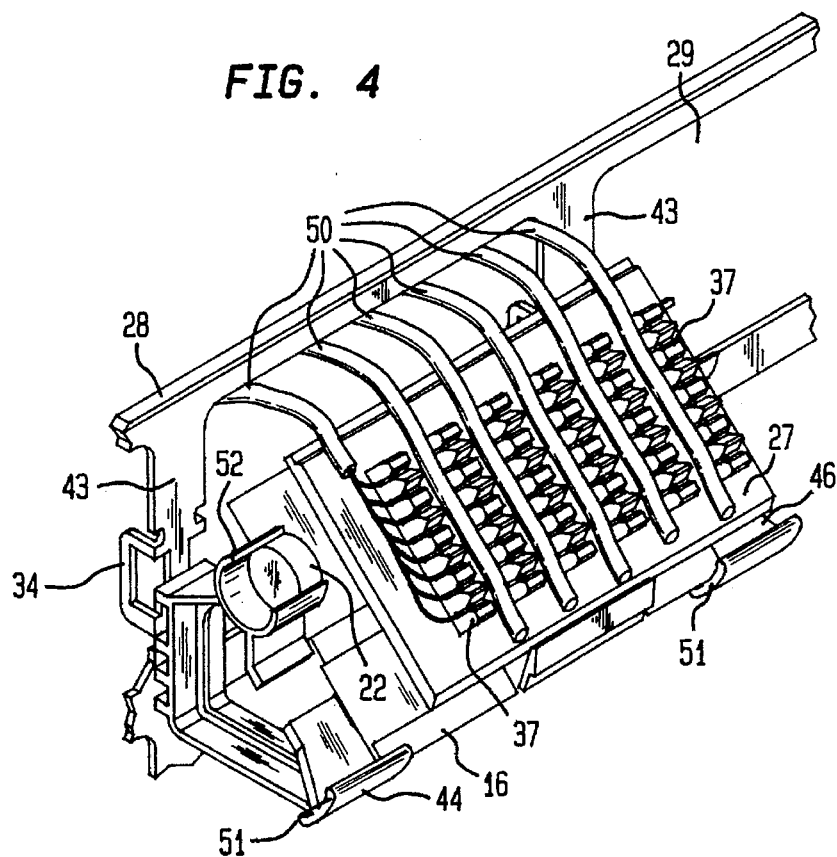

In FIGS. 3, 4, and 5, there are shown the steps involved in wiring a connector block in a second preferred embodiment of the invention. In FIG. 3, a portion of the panel 28 is shown, as modified by first and second latch openings 41 and 42 formed in the upstanding webs 43,43 in the panel. Retainer clips 44,46, preferably formed of a suitable polycarbonate material, have latching members 47 and 48 formed on a rear surface thereof which are adapted to fit within the openings 42 and 41 respectively to latch the clip in place on the panel. In FIG. 3 the clip 44 is shown mounted in place, while the clip 46 is shown being mounted. The clip 46 is mounted by insertion of latch member 47 in opening 42 and rotation of the clip 46 in the direction of the shaded arrow until member 48 snaps into place in opening 41. The details of the configuration of retainer clips 44 and 46, which are identical, will be discussed more fully in connection with FIGS. 6A, 6B, and 6C. When the clips 44 and 46 are in place on panel 28, and the wire groups 50 are drawn through the opening 29, the connector block 11 is placed on and supported by the retainer clips 44 and 46, with the flanges 16 resting upon a contoured flange 51 on each of the clips 44 and 46, and with the pivot pins 22 and 23 resting in semi-circular support portions 52 on each of the clips 44 and 46, and the rear face 27 of block 11 facing to the front, as shown in FIG. 4. The individual wires in each of the groups 50,50 are then dressed to length and inserted into their respective IDC's 38,38 as shown in FIG. 4. It can be seen that with the transverse orientation of the IDC's, the individual wires may be placed alongside the column 37 and rest against or closely adjacent to rear surface 27. Such an arrangement is more orderly than would be the case if the IDC's were oriented parallel to the column 37. After all of the wires have been connected in the manner shown in FIG.

4, the block 11 is removed from the retainer clips 44 and 46 and rotated to bring the front surface 14 to the front and, with the pivot pins 22 and 23 riding in their respective mounting brackets 34, the block 11 is snapped into place and held there by means of latch 18, as shown in FIG. 5. Introduction of the pins 22 and 23 into brackets 34 is facilitated by notches 53 in the webs 43 which create an opening slightly wider than the transverse distance defined by the ends of the pins 22 and 23 so that they may pass therethrough and then drop down within the brackets 34 to rest thereon and to be prevented from slipping out by means of the un-notched retaining portion 54 of web 43. Thus, once the block 11 is in place and latched by means of latch 18, it is held firmly in place.

As shown in FIG. 5, after block 11 is in place, connections may be made thereto. A single connector cable 56, terminated by a male connector 57 adapted to fit within the connector jack opening 12 is shown connected to block 11. Retainer clips 44 and 46 may be removed after the connector block is installed; however, when left in place, they function to support and maintain the cables 56 nearly adjacent the panel, thereby minimizing confusion, as shown in FIG. 5.

Figure 6B:
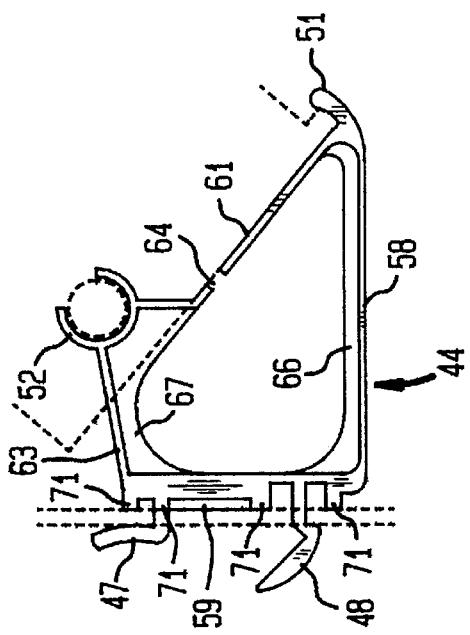
FIG. 6B is a side elevation view of the retainer clip of FIG. 6A.
Figure 6C:
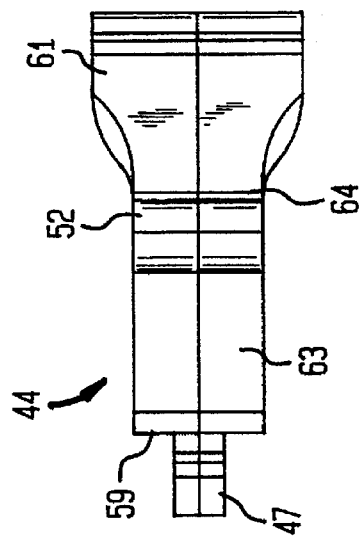
FIG. 6C is a plan view of the retainer clip of FIG. 6A.
Figure 6A:
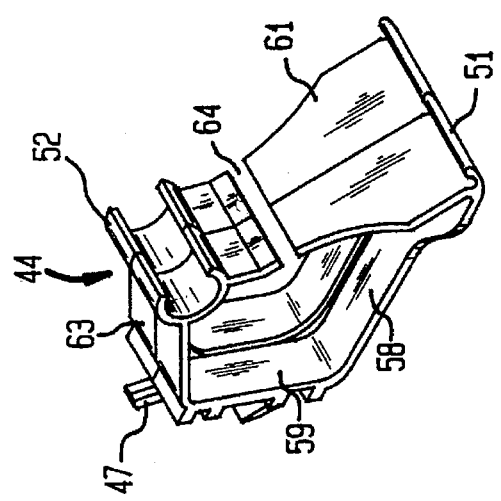
FIG. 6A is a perspective view of a retaining clip for use in the steps illustrated in FIGS. 3, 4 and 5.

FIGS. 6A, 6B and 6C depict the configuration of the retainer clip 44. As is shown in FIG. 6B, the clip 44 has the approximate shape of a frustrated triangle and comprises a base web 58, a rear support web 59, a sloping web 61, and a semi-circular pivot pin supporting member or bushing 52 joined to web 61 and to rear web 59 by means of a web 63. Web 61 has a slot 64 extending across it to allow cables 56 to pass through and to rest upon web 58, as shown in FIG. 5. The clip 44 is preferably molded from a suitable polycarbonate material, and has strengthening ribs 66 and 67 formed during the molding process to strengthen the webs 58, 59, and 63 as well as providing extra support for the semi-circular support bushing member 52. First and second semiresilient latch clips 47 and 48 extend from the rear face of rear web 59, as best seen in FIG. 6B, and the rear face of web 59 also has stand-offs 71,71 formed thereon. At the junction of webs 58 and 61 is a contoured flange 51 which is adapted to receive and to hold flange 16 of connector block 11 as shown by the dashed lines in FIG. 6B, while pivot pins 22 and 23 rest in the support bushings 52,52, also as best seen in FIG. 6B.

As was discussed in connection with FIG. 3, clips 44, which is identical to clip 46 and the other clips, which are not shown, is attached by insertion of latch clip 47 into hole 42 in panel 28 and rotation of retainer clip 44 (or 46) to cause latch clip 48 to pass through hole 41 and to snap into place. The resiliency of clips 47 and 48, and the presence of stand-offs 71,71 insure that the retainer clip 44 is firmly held in place on panel 28, as best seen in FIG. 6B.

Figure 7A:
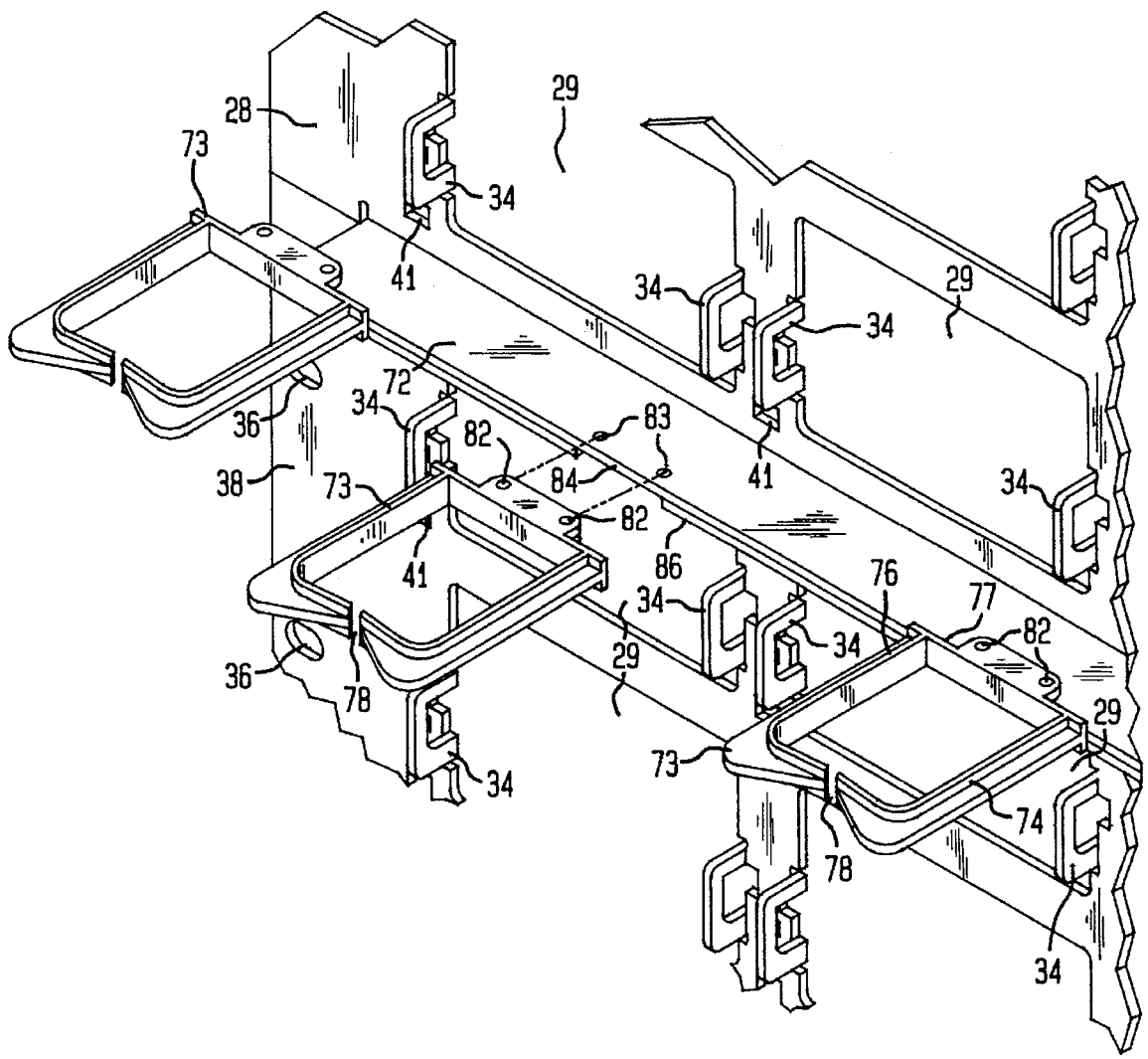
FIG. 7A is a perspective view of the rear of the panel of FIG. 2, showing the cable organizing brackets for use with the invention.
Figure 7B:
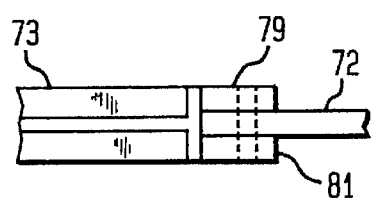
FIG. 7B is a detail of the arrangement of FIG. 7A.

In FIG. 7A there is shown an arrangement for organizing the feeder cables located in the rear of the rack upon which the panels 28,28 are to be mounted. Panel 28 is formed with, or has attached thereto, a transverse flange member 72 to which are attached one ore more cable organizing brackets 73,73. Each bracket 73 has first and second legs 74 and 76 extending from cross piece 77 to form an approximately D-shaped bracket having a cable opening 78 for passage of a cable into the interior space of the D-shape. Extending from cross-piece 77 are first and second mounting flanges 79 and 81, as best seen in FIG. 7B, spaced apart to receive flange 72, to which they may be affixed by means of bolts (not shown) through holes 82,82 in the flanges 79 and 81, and mating holes 83,83 in flange 72. As shown in FIG. 7A, flange 72 has a notch 84 for receiving flange 81, which may be formed in flange 72, or which may be formed by means of a second interrupted flange member 86, as shown. It is to be understood that there is shown in FIGS. 7A and 7B only one possible, albeit preferred, way of mounting the cable organizers 73,73, to the rear of panel 28. In addition, such organizers may have any of a number of different forms or shapes, that, shown in FIGS. 7A and 7B, being by way of example only.

Figure 8A:
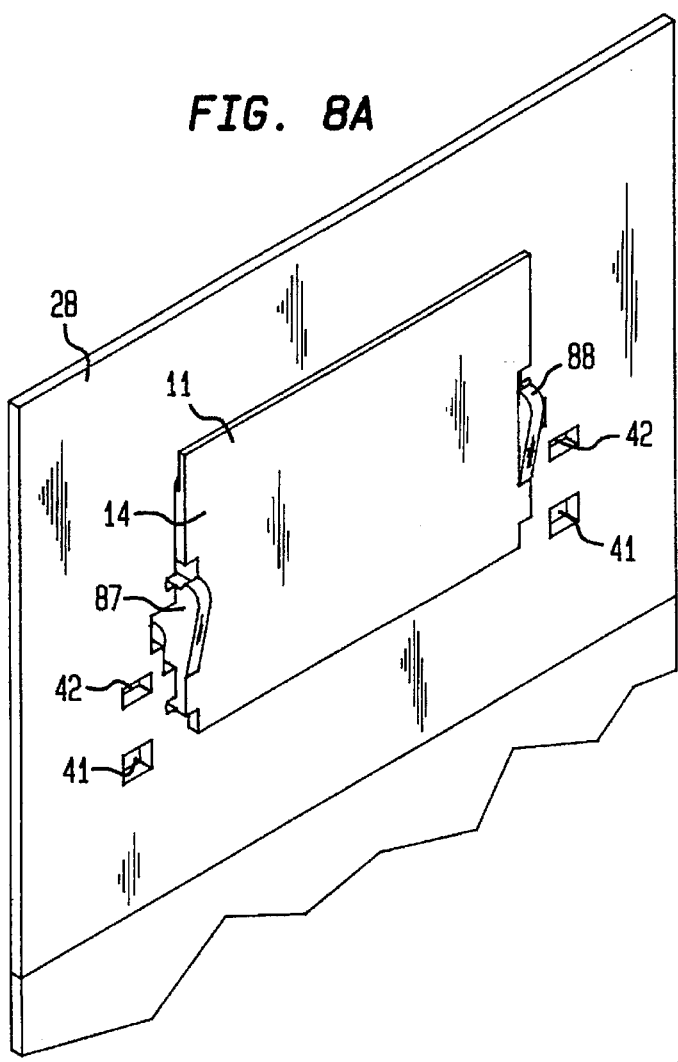
FIG. 8A is a perspective view of a modified connector block.
Figure 8B:
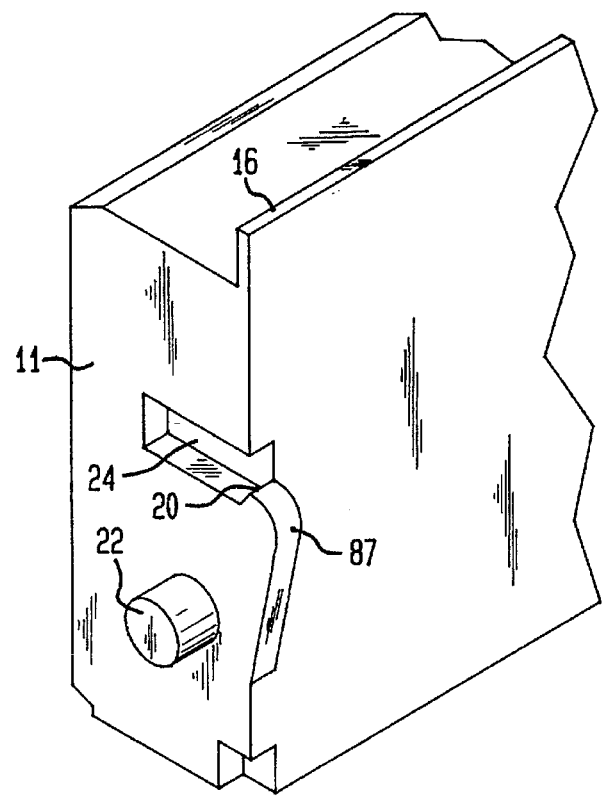
FIG. 8B is a detail of the arrangement of FIG. 8A.

In FIGS. 8A and 8B there is shown a modified connector block 11, wherein radiused ramps 87 and 88 extend from the front face 14 of block 11 on either side thereof. Ramps 87 and 88 are preferably formed when block 11 is molded or otherwise formed, and function to facilitate insertion of the block 11 into the opening 29 by acting as guides. For simplicity, the remaining details of block 11 have not been shown.

The present invention constitutes a modular panel and connector arrangement that requires no mounting hardware, that permits access to the rear of the connectors from the front of the panel, that greatly increases both flexibility and diversity in making connections, and that affords both cable and wire management to reduce the level of confusion that obtains with unconfined wires and cables. In addition, the modular connector blocks can individually be wired, repaired, or the connections switched without disturbing the remaining connectors arrayed on the panel, or the panel itself.

The principals and features of the invention have been shown in preferred embodiments thereof. Numerous alterations or changes, or other embodiments may occur to workers in the art without departure from the spirit and scope of the invention.

We claim:

1. A modular connection panel and connector assembly comprising, in combination:

a panel member having at least one aperture therein and front and rear surfaces;

a connector block adapted to fit within said aperture, said connector block having from and rear surfaces and first and second side surfaces, and at least one connector jack opening forming a connector jack in said front surface;

said connector block further having a first pivot pin extending from said first side and a second pivot pin extending from said second side;

connector means on said rear surface of said connector block for connecting wires to the connector jack;

means for holding and allowing said connector block to pivot on an axis defined by said pivot pins relative to said panel members between open and closed positions; and means for locking said connector block in the open position.

2. The assembly as claimed in claim 1 wherein said means for allowing said connector block to pivot on an axis defined by said pivot pins comprises first and second mounting brackets into which said pivot pins are inserted, said mounting brackets extending from said rear surface of said panel member on either side of the aperture therein.

3. The assembly as claimed in claim 1 wherein said connector means comprises slotted insulation displacement connectors.

4. The assembly as claimed in claim 3 wherein the slots of the insulation displacement connectors are oriented parallel to said axis defined by said first and second pivot pins.

5. The assembly as claimed in claim 1 and further comprising latch means for locking said connector block in place in said aperture in said panel.

6. The assembly as claimed in claim 5 wherein said latch means comprises a cantilevered latch at the top of said connector block.

7. The assembly as claimed in claim 1 wherein said means for locking comprises a slot in one of said side surfaces.

8. The assembly as claimed in claim 7 wherein said slot extends from said front surface to said rear surface.

9. The assembly as claimed in claim 7 wherein said aperture in said panel member has first and second lower corners, at least one of which has a sloped portion adapted to fit within said slot to stop reverse rotation of said connector block.

10. The assembly as claimed in claim 1 wherein said connector block has six eight pin connector jacks formed therein arrayed in a row parallel to the axis defined by said pivot pins and said connector means on said rear surface comprises an array of columns of connector means, each column being associated with one of said connector jacks and having eight individual connectors.

11. The assembly as claimed in claim 10 wherein said connectors are slotted insulation displacement connectors having their slots extending parallel to the axis of said first and second pivot pins.

12. The assembly as claimed in claim 1 wherein said connector block is made of a plastic material.

13. The assembly as claimed in claim 1 wherein said panel member is made of a metallic material.

14. The assembly as claimed in claim 1 and further including means mounted on the rear surface of said panel for organizing and holding cables to be connected to said connector assembly.

15. The assembly as claimed in claim 14 wherein said means for organizing comprises at least one substantially D-shaped bracket.

16. A modular connector panel and connector assembly comprising, in combination:

a panel member having at least one aperture therein and front and rear surfaces;

a connector block adapted to fit within said aperture, said connector block having front, rear, and side surfaces and at least one connector jack formed in said front surface of said block;

said connector block having pivot pins extending from the side surfaces thereof and defining an axis of rotation;

connector means on said rear surface for connecting wires to said connector jack;

mounting means for holding said connector block in fixed position in front of said panel for providing access to said connector means, said mounting means comprising first and second retainer clips on said panel on either side of said aperture wherein said retainer clips are removably mounted to said panel member on the front surface thereof; and means for pivotally mounting said connector block to said panel member within said aperture.

17. The assembly as claimed in claim 16 wherein each of said retainer clips includes means for supporting one of said pivot pins.

18. The assembly as claimed in claim 16 wherein each of said retainer clips includes means for preventing rotation of said connector block while being held by said retainer clip.

19. The assembly as claimed in claim 18 wherein said means for preventing rotation of said connector block comprises a contoured flange on each of said retainer clips for holding a portion of said connector block.

20. An assembly as claimed in claim 16 wherein each of said retainer clips includes means for organizing connector cables connected to the connector jacks in said connector block.

21. A connector block for use with a connector panel apertured to receive said block, wherein the panel has support means for pivotally supporting said block, said block comprising:

a body having a front, a rear, and first and second side surfaces;

one or more connector jacks in said block having openings in the form of said block;

one or more connectors on the rear of said block for providing connection to said jacks;

first and second pivot pins extending from said first and second side surfaces respectively of said body and defining an axis of rotation for insertion into the support means of the panel;

said connector block having an open position and a closed position defined by rotation thereof about said axis of rotation; and means for locking said connector block in the open position.

22. A connector block as claimed in claim 21 wherein said body has a top surface and a flange extending beyond said top surface on the front of said body.

23. A connector block as claimed in claim 22 wherein said flange member has an opening therein and a latch means extending into said opening.

24. A connector block as claimed in claim 23 wherein said latch means is a cantilevered member on said top surface.

25. A connector block as claimed in claim 21 wherein said body has a plurality of connector jacks on the front thereof extending into said body and arranged in a row substantially parallel to said axis of rotation.

26. A connector block as claimed in claim 25 wherein said body has a plurality of connectors on the rear thereof arranged in columns, each of the connectors in a column being connected to one of said connector jacks.

27. A connector block as claimed in claim 26 wherein said connectors are slotted insulation displacement connectors with the slots thereof oriented parallel to said axis.

28. A connector block as claimed in claim 21 wherein said body has radiused ramps on either side of the front thereof for facilitating insertion of said block into an aperture in the panel.

29. A connector block as claimed in claim 21 wherein said body is made of a plastic material.

30. A connector block for use with a connector panel apertured to receive said block, wherein the panel has support means for pivotally supporting said block, said block comprising:

a body having a front, a rear, and first and second side surfaces;

one or more connector jacks in said block having openings in the front of said block;

one or more connectors on the rear of said block for providing connection to said jacks;

first and second pivot pins extending from said first and second side surfaces respectively of said body and defining an axis of rotation for insertion into the support means of the panel; and radiused ramps on either side of the front of said body for facilitating insertion of said block into an aperture in the panel.

* * * * *